(12) United States Patent
Eirinberg et al.

(10) Patent No.: US 11,153,238 B2
(45) Date of Patent: Oct. 19, 2021

(54) DYNAMIC APPLICATION CONFIGURATION

(71) Applicant: Snap Inc., Santa Monica, CA (US)

(72) Inventors: Dylan Shane Eirinberg, Venice, CA (US); John Jensen, Santa Monica, CA (US); Alexander R. Osborne, Los Angeles, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 14 days.

(21) Appl. No.: 16/408,036

(22) Filed: May 9, 2019

(65) Prior Publication Data
US 2020/0220823 A1 Jul. 9, 2020

Related U.S. Application Data

(60) Provisional application No. 62/789,823, filed on Jan. 8, 2019.

(51) Int. Cl.
| | |
|---|---|
| *H04L 12/58* | (2006.01) |
| *A63F 13/792* | (2014.01) |
| *A63F 13/61* | (2014.01) |
| *G06Q 30/02* | (2012.01) |

(52) U.S. Cl.
CPC ............ *H04L 51/046* (2013.01); *A63F 13/61* (2014.09); *A63F 13/792* (2014.09); *G06Q 30/0209* (2013.01)

(58) Field of Classification Search
CPC ....... H04L 51/063; H04L 51/046; A63F 13/48
USPC ......................................................... 709/206
See application file for complete search history.

(56) References Cited

U.S. PATENT DOCUMENTS

| | | | | |
|---|---|---|---|---|
| 2004/0224772 | A1* | 11/2004 | Canessa ................ | A63F 13/335 463/42 |
| 2008/0140528 | A1* | 6/2008 | Ganz .................. | G06Q 30/0258 705/14.12 |
| 2010/0268964 | A1* | 10/2010 | Carrel ................ | H04N 21/4532 713/189 |

(Continued)

FOREIGN PATENT DOCUMENTS

WO WO-2020146496 A1 7/2020

OTHER PUBLICATIONS

"International Application Serial No. PCT/US2020/012735, International Search Report dated Jun. 23, 2020", 6 pgs.

(Continued)

*Primary Examiner* — Mahran Y Abu Roumi
(74) *Attorney, Agent, or Firm* — Schwegman Lundberg & Woessner, P.A.

(57) ABSTRACT

Methods and systems for providing multiple versions of an application in a social network are described. In some aspects, a first version of the application provides a first set of features while a second version of the application provides the first set of features and also a second set of features. Both the first version of the application and the second version of the application access the same application state data, which may be maintained by a back-end system, such as a social network. When the state data is updated by one or the other versions of the application, a notification may be provided to the other version of the application informing it of the update. The application state data may represent, for example, a shared gaming environment accessed by both the first and second versions of the application.

20 Claims, 13 Drawing Sheets

(56) References Cited

U.S. PATENT DOCUMENTS

| | | | | |
|---|---|---|---|---|
| 2013/0303267 A1* | 11/2013 | Vasguez | ............ | G07F 17/3241 |
| | | | | 463/25 |
| 2014/0087355 A1* | 3/2014 | Henry | ................... | G09B 7/00 |
| | | | | 434/362 |
| 2016/0279523 A1* | 9/2016 | Altagar | ............. | A63F 13/2145 |
| 2017/0054662 A1* | 2/2017 | Crocker | .............. | H04L 51/063 |
| 2018/0255051 A1* | 9/2018 | Long | ..................... | G06F 11/30 |
| 2018/0276111 A1* | 9/2018 | Datta | ................ | G06F 11/3696 |
| 2018/0352278 A1* | 12/2018 | Myers | .............. | H04N 21/2668 |
| 2020/0213359 A1* | 7/2020 | Arbel | .................... | H04L 63/20 |

OTHER PUBLICATIONS

"International Application Serial No. PCT/US2020/012735, Written Opinion dated Jun. 23, 2020", 9 pgs.

"International Application Serial. No. PCT/US2020/012735, Invitation to Pay Additional Fees dated Apr. 24, 2020", 10 pgs.

\* cited by examiner

DYNAMIC APPLICATION CONFIGURATION

CROSS-REFERENCE TO RELATED APPLICATION

This application claims the benefit of priority of U.S. Provisional Patent Application No. 62/789,823, entitled "DYNAMIC APPLICATION CONFIGURATION," filed on Jan. 8, 2019, the entirety of which is hereby incorporated by reference herein.

TECHNICAL FIELD

The present disclosure relates generally to a software development kit (SDK), and more particularly to facilitating interactions between messaging and third-party or gaming applications using the SDK.

BACKGROUND

Social networking applications support a broad array of features, which continues to expand. Some of these features include the ability to integrate third party applications into the social networking framework.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
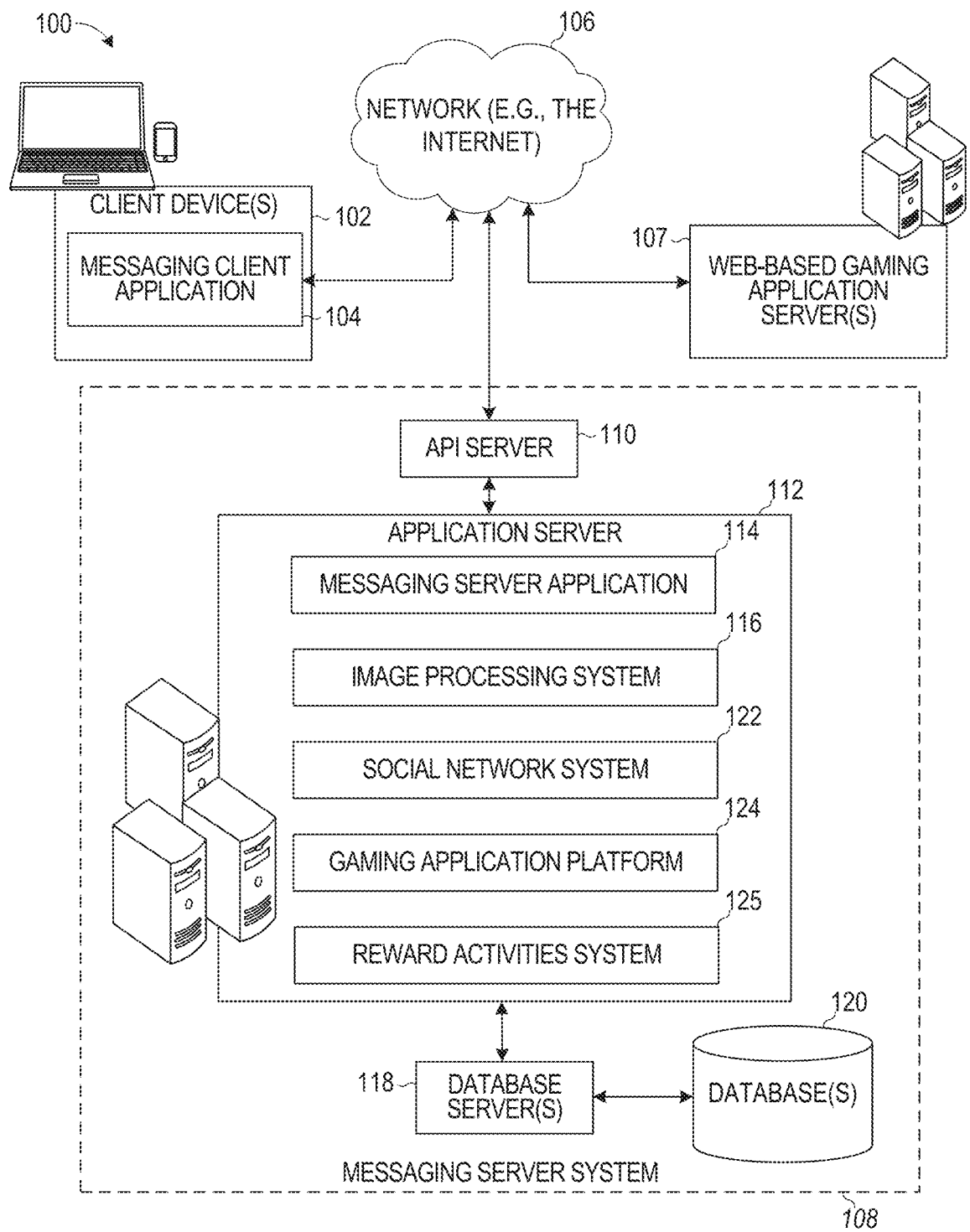
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The disclosed embodiments improve the functioning and operation of the device by providing a dynamic application configuration. The applications can be dynamically configured to present a variety of features or functions depending on configuration information that may be set by a user of the application or by a systems administrator which improves functioning and operation of the system and device.

In some aspects, a new application is uploaded to a social network platform via an administrative tool. The new application is then configured to indicate one or more features of the application that may be subject to dynamic configuration. For example, the administrative tool may provide for users to selectively configure one or more first features. The administrative tool may also provide for administrators to configure one or more second features. In some cases, the configuration may indicate that payment of either real or virtual currency of some amount may be necessary to enable one or more features. In some cases, the configuration may indicate that different levels of access associated with users, such as standard or premium levels of access, may be necessary to enable one or more features.

The application may then be made available to a set of users. Each user may then customize zero or more of the features made available by the administrator. For example, as the administrator configures dynamic features of an application, the administrator may indicate whether the feature may be further configured by a user. Thus, the administrator may configure application "global" settings that apply to all users. These global settings may then be individually customized by one or more users interacting with the application. The ability for users to customize a feature depends on whether the administrator enabled such customization when initially setting up the application.

These applications have a need to perform functions that access user data. For example, some applications may wish to provide for in application purchases, requiring execution of ecommerce transactions. Performance of an ecommerce transaction may require access to user data, and in particular, sensitive user data, such as credit card information or other financial information that may be stored in the social network for the user. However, these applications may not necessarily be fully trustworthy. For example, the applications may be written in a non-secure language, such as Hypertext Markup Language 5 (HTML5), which may present one or more security vulnerabilities. For example, an application written in HTML5 may be edited in an unsecure manner, such that it may not be practical to trust what operations the application may attempt. Thus, exposing user data to these applications may present an unacceptable security risk. To mitigate against this risk, while still providing the applications with an ability to perform functions that require access to user data, the disclosed embodiments improve the functioning and operation of the device by providing an interface to the web-based applications running in a web view. The web-based applications are configured to run in a first security domain that restricts access to user data. The web-based applications may then generate requests to a native application, or messaging application, for certain functions that require access to the user data.

Furthermore, the disclosed embodiments improve the functioning and operation of the device by providing for multiple versions of an application to access equivalent state information maintained by a social network. As one example, a first application version may have a first set of features and a second application version of the same application (e.g., the same game) may make available both the first set of features as well as a second set of features which are not available in the first application. Both the first and second application versions may access equivalent state information maintained by a social network. For example, two versions of a game application may access the same state information, such that two users operating two versions of an application having different feature sets may still participate in the common gaming experience.

The disclosed embodiments improve the functioning and operation of the device by providing a platform that facilitates communication between the messaging application and the web-based application (e.g., a web-based gaming application). According to certain embodiments, the web-based application can securely obtain user data and determining a level of access, such as whether the user has premium level of access or standard level of access, using data from the messaging application. This allows the web-based application to enable access to different sets of features, such as by providing different versions of the web-based application, based on the level of access associated with the user which improves the functioning and operation of the system and device. In an embodiment, the messaging application facilitates a purchase transaction for the user to upgrade a level of access to premium level of access independently of launching the web-based application. In this way, the messaging application can collect and utilize payment information from the user to complete the purchase transaction and such sensitive information need not be provided by the user to the web-based application. Once the purchase transaction is completed by the messaging application, the messaging application can securely, via the platform or directly, inform or transmit a communication to the web-based application indicting that the level of access of the user has been upgraded or indicating that the user has premium level of access. Using the platform, only the information necessary for the user to utilize the web-based application is provided by the messaging application to the web-based application which improves the functioning and operation of the device.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

Each messaging client application 104 is also able to communicate with one or more web-based gaming application servers 107. Each web-based gaming application server 107 hosts, for example, an HTML5-based game. Particularly, the messaging client application 104 launches a web-based game by accessing the HTML5 file from the web-based gaining application server 107 associated with the game. In certain embodiments, the games hosted by the web-based gaming application server 107 are programmed in JavaScript leveraging an SDK stored on a gaming application platform 124 provided by the messaging server system 108. The SDK includes application programming interfaces (APIs) with functions that can be called or invoked by the web-based gaming application. In certain embodiments, the gaming application platform 124 includes a JavaScript library that provides a given gaming application access to certain user data of the messaging client application 104. HTML5 is used as an example technology for programming games, according to some embodiments, but games programmed based on other technologies can be used. The disclosure pertaining to web-based gaming applications applies similarly to any other type of web-based application, such as web-based third-party applications.

In order to integrate the functions of the SDK into the game (or third-party application), the SDK is downloaded by the web-based gaming application server 107 from the messaging server system 108 or is otherwise received by the web-based gaining application server 107. Once downloaded or received, the SDK is included as part of the application code of the web-based game. The code of the web-based game can then call or invoke certain functions of the SDK to integrate features of the messaging client application 104 into the web-based gaming application.

The SDK stored on the gaming application platform 124 effectively provides the bridge between the web-based gaming application (or third-party web-based application) and the messaging client application 104. This provides the user with a seamless experience of communicating with their friends on the messaging client application 104, preserving the look and feel of the messaging client application 104, while playing a web-based gaming application. To bridge the web-based gaming application and the messaging client application 104, in certain embodiments, the SDK facilitates communication between the web-based gaining application server 107 and the messaging client application 104. In certain embodiments, a WebViewJavaScriptBridge running on a client device 102 establishes two one-way communication channels between the web-based gaming application and the messaging client application 104. Messages are sent between the web-based gaming application and the messaging client application 104 via these communication channels asynchronously. Each SDK function invocation is sent as a message, and callback for each SDK function is implemented by constructing a unique callback identifier and sending a message with that callback identifier.

By utilizing the SDK, not all of the information from the messaging client application 104 is shared with the web-based gaming application server 107. The SDK limits which information is shared based on the needs of the web-based gaming application and based on a context from which the web-based gaming application was launched by the messaging client application 104.

In certain embodiments, each web-based gaming application server 107 provides the HTML5 file corresponding to the web-based gaining application to the messaging server system 108. The messaging server system 108 can add a visual representation of the game in the messaging client application 104. Once the user selects the visual representation or instructs the messaging client application 104 through a GUI of the messaging client application 104 to launch the game (or other web-based application), the messaging client application 104 obtains the HTML5 file and initiates all the resources necessary to launch the game. In some cases, the messaging client application 104 accesses the corresponding web-based gaming application server 107 to launch the game.

In certain embodiments, the same web-based application may have multiple HTML5 files, each corresponding to a different version of the application. For example, a first HTML5 file may correspond to a first version of the application that has a first set of features enabled, such as for standard level of access users. For example, a second HTML5 file may correspond to a second version of the application that has a second set of features enabled that include the first set of features and additional features, such as for premium level of access users. In some embodiments, the first set of features may correspond to first options, first features, first rewards, first reward earn rates, and first levels that are accessible for standard level of access with advertisements. In some embodiments, the second set of features may correspond to the first options, first features, first rewards, first reward earn rates, and first levels that are accessible for standard level of access without advertisements. In some embodiments, the second set of features may correspond to second options, second features, second rewards, second reward earn rates, and second levels that are accessible for premium level of access with or without advertisements.

The HTML5 file corresponding to the web-based gaming application may include a unique identifier of the web-based gaming application. The HTML5 file may also include level-of-access-related information. Specifically, the HTML5 file may include identifiers of various stages or levels in the web-based gaming application and whether or not the levels or stages are enabled or disabled for particular levels of access. For each stage or level, the HTML5 file may specify one or more types levels of access needed to enable the stage or level. The unique identifier of the web-based gaming application and the association between different levels or stages in the game and the corresponding levels of access needed to enable the levels or stages may be stored in a database 120 accessible to the gaming application platform 124.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to the database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 and the web-based gaming application server 107 in order to invoke functionality of the application server 112. The API server 110 exposes various functions supported by the application server 112, including: account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding of friends to and deleting of friends from a social graph; the location of friends within a social graph; access to reward activities and/or virtual currency stored on a reward activities system 125; access to user conversation data; access to avatar information stored on the messaging server system 108; access to authentication tokens; access to a leaderboard; access to game score information; and opening an application event (e.g., relating to the messaging client application 104).

The application server 112 hosts a number of applications and subsystems, including the messaging server application 114, an image processing system 116, a social network system 122, the gaining application platform 124, and the reward activities system 125. The messaging server application 114 implements a number of message processing technologies and functions, particularly related to the aggregation and other processing of content (e.g., textual and multimedia content) included in messages received from multiple instances of the messaging client application 104. As will be described in further detail, the textual and media content from multiple sources may be aggregated into collections of content (e.g., called stories or galleries). These collections are then made available, by the messaging server application 114, to the messaging client application 104.

Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with whom a particular user has relationships or whom the particular user is "following," and also the identification of other entities and interests of a particular user. Such other users may be referred to as the user's friends.

The reward activities system 125 stores multiple advertisements. These advertisements may include a collection of video clips (e.g., 10 second video clips, less than 10 second video clips, and/or 30-40 second video clips). A given web-based gaming application can use the advertisements stored on the reward activities system 125 to provide a reward to a user in the web-based gaming application. For example, a user can be provided with the option to watch a given advertisement in the video game to access various features (e.g., advance a level, to upgrade armor or weapons, to increase a score, or to purchase game content). In certain cases, a first set of features may be available for users associated with standard level of access if the user watches one or more advertisements or pays a given fee. In certain cases, the first set of features may be available for users associated with premium level of access (e.g., a level of access with greater access rights than the standard level of access) without requiring the user to watch one or more advertisements or if the user pays a fee lower than the given fee. The reward activities system 125 can include a collection of profiles for each user of the messaging server system 108. Based on the profiles, the reward activities system 125 can select advertisements suitable for or that may interest a given user. The reward activities system 125 may also keep track of which advertisements each user of the messaging server system 108 has watched to avoid presenting the same advertisements multiple times to the same user. Leveraging the reward activities system 125 managed by the messaging server system 108 avoids the web-based gaming application server 107 having to obtain and manage its own advertisements.

The status information may include a unique identifier associated with the web-based gaming application. The web-based gaming application may access the database 120 to obtain the expected unique identifier and compare the expected unique identifier with the identifier received in the status information. In response to determining that the identifiers match each other or correspond in an expected way, the web-based gaining application may provide the user the certain quantity of virtual tokens or currency or item associated with the reward activity.

The reward activities system 125 implements a reward system for users of the social network system 122. The reward system may provide for a user of the social network system 122 to perform one or more voluntary actions that may provide compensation to the user. The voluntary actions may include, for example, watching a video, viewing an image, reading some text, and/or taking a survey.

Figure 2:
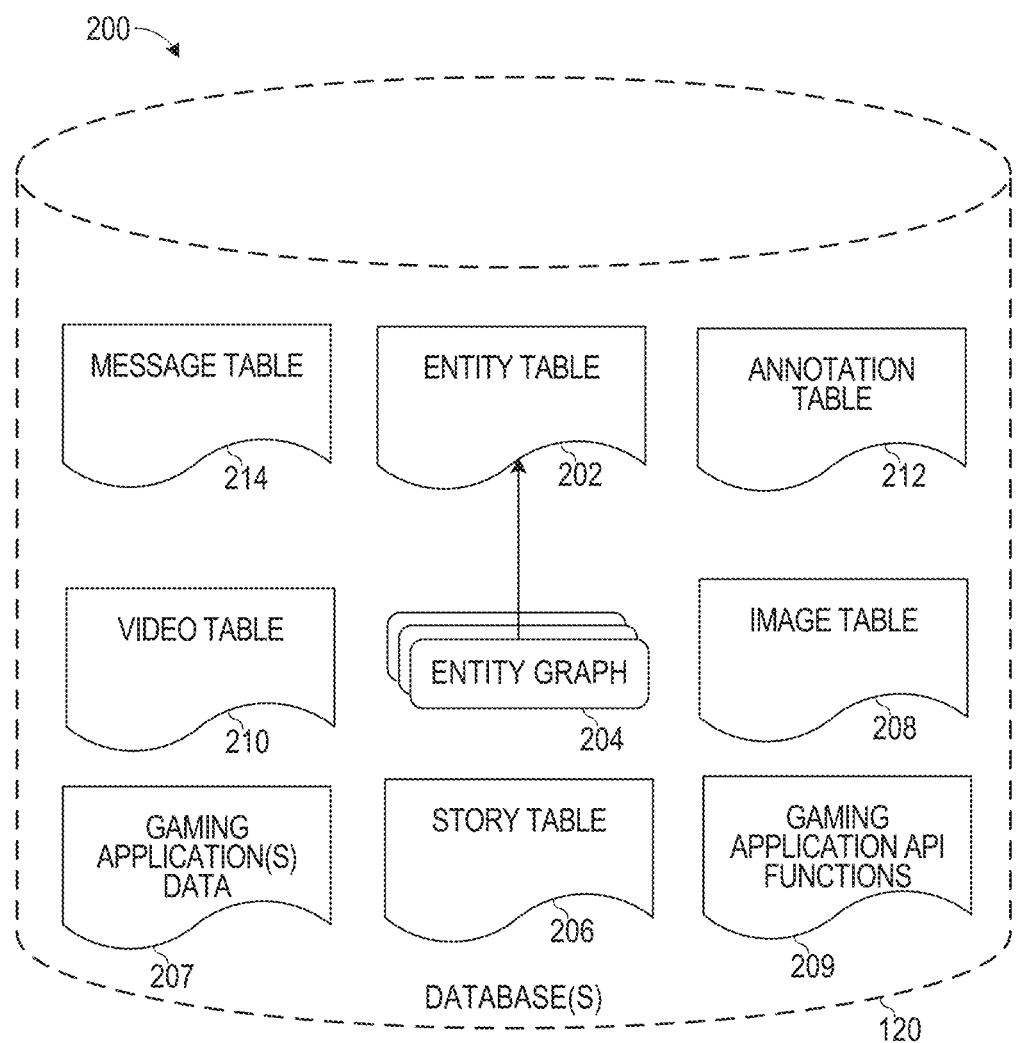
FIG. 2 is a schematic diagram illustrating data which may be stored in a database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

The message table 214 may store a collection of conversations between a user and one or more friends or entities. The message table 214 may include various attributes of each conversation, such as the list of participants, the size of the conversation (e.g., number of users and/or number of messages), the chat color of the conversation, a unique identifier for the conversation, and any other conversation-related feature(s). Information from the message table 214 may be provided in limited form and on a limited basis to a given web-based gaming application based on functions of the messaging client application 104 invoked by the web-based gaming application.

The database 120 also stores annotation data, in the example form of filters, in an annotation table 212. The database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the annotation table 212 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the message table 214. The entity table 202 may associate various annotations from the annotation table 212 with various images and videos stored in the image able 208 and the video table 210.

Gaming application(s) data 207 stores gaming information associated with one or more web-based gaming applications. Such gaming information may include a visual representation or icon of the given web-based game. Such a visual representation is used by the messaging application to identify the game and allow the user to select the visual representation to launch the game. The gaming information may include information identifying the maximum number of players a given game can host. This information is used by the messaging application to determine whether a game launched from a given conversation having a certain number of participants can support all of the participants of the conversation. The gaming information may include score information for each game. Such score information can be used by the messaging application to manage and maintain a leaderboard that is specific to each game and/or that is geographically relevant. Namely, the leaderboard can represent leaders of the web-based game among a group of users in a particular geographical location or across the entire list of users of the messaging application. A leader represents a user with a higher score than another user, though other attributes can be used to define a leader (e.g., a user who plays a game for more time than another user).

Gaming information stored in the gaming application(s) data 207 may store a set of user identifiers of different users of the messaging client application 104. For each user identifier, the gaming information may include the set of games installed or activated for the user. For each game activated for the user, the gaming information stores the level of access associated with the user. In an embodiment, when a given user selects an option to upgrade a level of access (e.g., from standard level of access to premium level of access), the messaging client application 104 facilitates a transaction between the user and a purchasing server. Once the transaction is complete, the level of access stored in the gaming information for the user in association with the game is update from standard level of access to premium level of access.

Gaining information stored in the gaining application(s) data 207 may include unique identifiers of each web-based gaming application. The unique identifiers may be associated with different versions of the web-based gaining application based on the level of access a given user has. For example, the unique identifiers may be associated with a first version that corresponds to standard level of access. For example, the unique identifiers may be associated with a second version that corresponds to premium level of access. Based on the gaming application platform 124 determining whether a given user is associated with standard or premium level of access, the gaming application platform 124 retrieves the appropriate version of the web-based gaming application. In certain embodiments, the same version of the web-based gaming application may be associated with all levels of access. In such cases, the gaming application platform 124 securely transmits a message to the web-based gaming application identifying the determined level of access of a given user. The web-based gaming application may then selectively enable or disable features based on the determined level of access indicated in the message received from the gaming application platform 124.

Gaming application API functions 209 stores a number of functions of the SDK stored on the gaming application platform 124. The gaming application API functions 209 stores the code that is executed when a given function of the API is invoked by the web-based gaming application or the messaging client application 104. Such API functions can include:

A function to initialize the web-based gaming application.

A function to set a volume of the web-based gaming application.

A function to provide an authentication token to the web-based gaming application.

A loading progress function which indicates to the messaging application the loading progress of the web-based game.

A loading complete function which indicates to the messaging application that loading of the web-based game has completed.

A fetch avatar image function which is used by the web-based gaming application to obtain an avatar matching a given user's identification.

A play with friends function to allow a user to select friends of the user on the messaging application to play with using the look and feel of the messaging application.

Reward activity-related functions to retrieve advertisements from the reward activities system 125 and track whether the user completed watching the given advertisements or performing the reward activity.

A leaderboard function to allow the web-based game to retrieve the leaderboard from the gaming application(s) data 207 to present to the user.

A submit score to leaderboard function to allow the web-based game to send to the messaging application score information for a given user to be updated in the leaderboard stored in the gaming application(s) data 207.

An add/remove user function to allow the messaging application to ad users to or remove users from the web-based gaming application.

A function to indicate the level of access associated with a given user or user identifier.

A focus function to allow the messaging application to inform the web-based gaining application whether the user has lost/regained focus in the game so that the game knows the user is or is not active in the game and whether the user can or cannot interact with the game directly.

A story table 206 stores data regarding collections of messages and associated image, video, or audio data, which are compiled into a collection (e.g., a story or a gallery). The creation of a particular collection may be initiated by a particular user (e.g., each user for whom a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
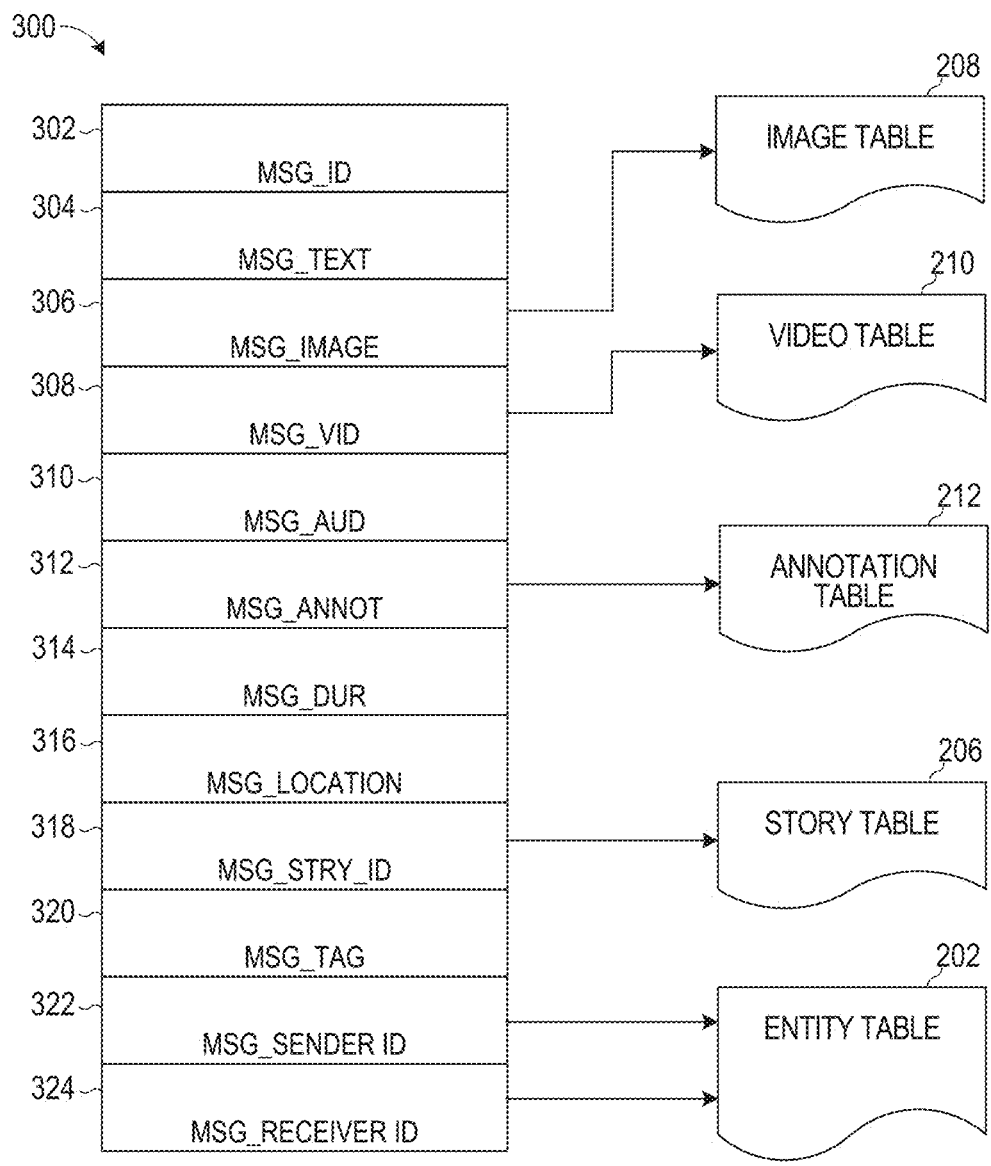
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104, the messaging server application 114, or the web-based gaming application server 107 (e.g., in response to functions being invoked in the API). The content of a particular message 300 is used to populate the message table 214 stored within the database 120, accessible by the messaging server application 114. Similarly, the content of a message 300 is stored in memory as "in-transit" or "in-flight" data of the client device 102, the web-based gaming application server 107, or the application server 112. The message 300 is shown to include the following components:

A message identifier 302: a unique identifier that identifies the message 300.

A message text payload 304: text, to be generated by a user via a UI of the client device 102 and that is included in the message 300, or identifying a given API function and data associated with its parameters. Message text payload 304 may include a level of access of a user and a username or identifier of the user.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to the message mage payload 306, message video payload 308, or message audio payload 310 of the message 300.

A message duration parameter 314: parameter value indicating, in seconds, the amount of time for which content of the message 300 (e.g., the message image payload 306, message video payload 308, and message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respective content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of one or more users of the client device 102 to whom the message 300 is addressed. In the case of a conversation between multiple users, the identifier may indicate each user involved in the conversation.

The contents (e.g., values) of the various components of the message 300 may be pointers to locations in tables within which content data values are stored. For example, an image value in the message image payload 306 may be a pointer to (or address of) a location within the image table 208. Similarly, values within the message video payload 308 may point to data stored within the video table 210, values stored within the message annotations 312 may point to data stored in the annotation table 212, values stored within the message story identifier 318 may point to data stored in the story table 206, and values stored within the message sender identifier 322 and the message receiver identifier 324 may point to user records stored within the entity table 202.

Figure 4:
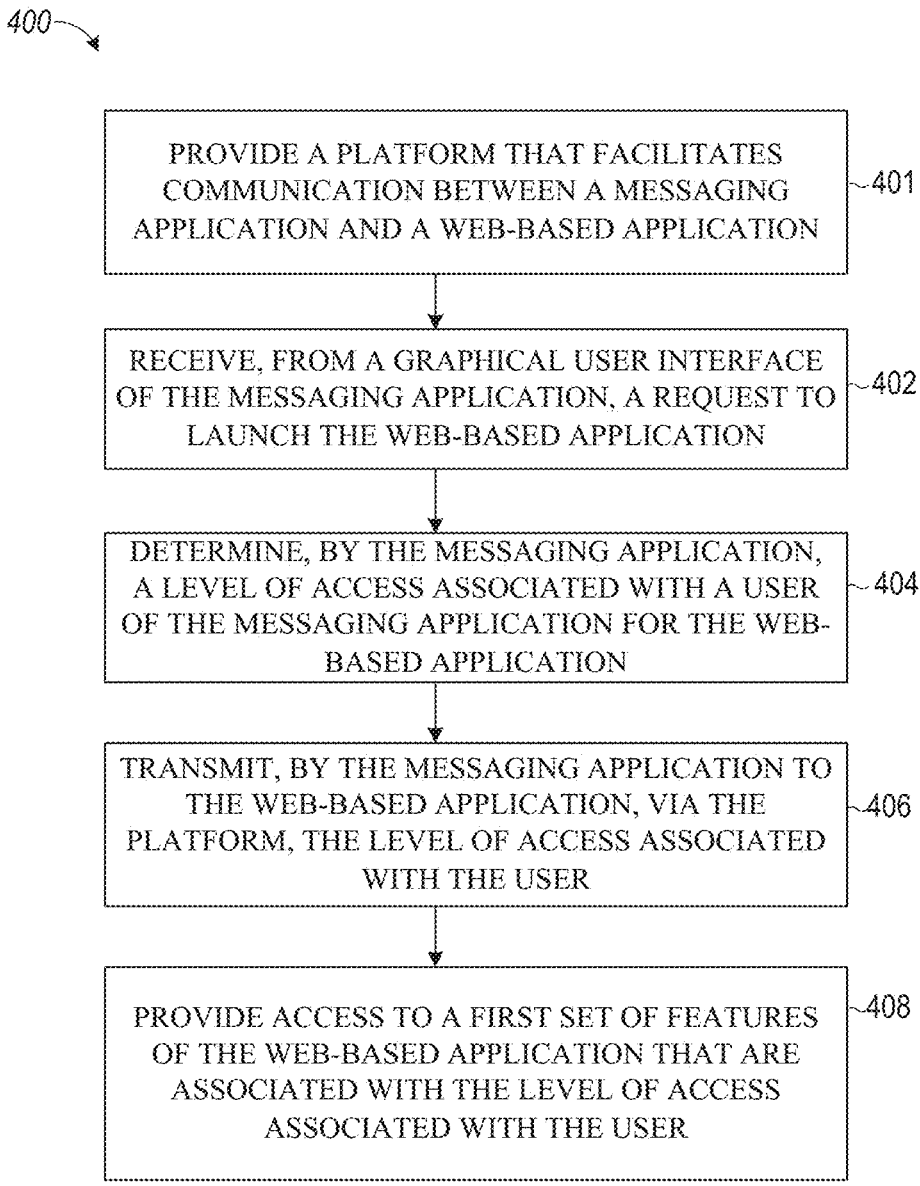
FIG. 4 is a flowchart illustrating example operations of a gaming application platform in performing processes for facilitating interactions between a messaging application and a web-based gaming application, according to example embodiments.

FIG. 4 is a flowchart illustrating example operations of the gaming application platform 124 and other components in performing process 400 for facilitating interactions between a messaging application and a web-based gaming application, according to example embodiments. The process 400 may be embodied in computer-readable instructions for execution by one or more processors such that the operations of the process 400 may be performed in part or in whole by the functional components of the messaging server system 108 or the web-based gaming application server 107; accordingly, the process 400 is described below by way of example with reference thereto. However, in other embodiments, at least some of the operations of the process 400 may be deployed on various other hardware configurations. The process 400 is therefore not intended to be limited to the messaging server system 108.

The process 400 may be performed by the gaming application platform 124 and/or reward activities system 125 to securely provide a level of access associated with a user for the web-based application from a messaging application to the web-based application. At operation 401, the gaming application platform 124 is provided to facilitate communication between a messaging application and a web-based application. For example, the gaming application platform 124 may store an SDK with various API functions that enable a web-based gaming application implemented on the web-based gaming application server 107 to access and integrate a feature of the messaging client application 104. A game developer may access the SDK by downloading the SDK from the gaming application platform 124 and installing the functions of the SDK in the code for the game. Various functions of the SDK can be invoked in the code for the game to integrate various features of the messaging application (e.g., a voice party, a chat interface, a, leaderboard, etc.). Similarly, functions of the SDK can be invoked by the messaging client application 104 to provide one or more features to a given web-based gaming application.

At operation 402, the gaming application platform 124 receives, from a graphical user interface of the messaging application, a request to launch the web-based application. For example, a user can request to launch a web-based application through a user interface shown in FIG. 5.

Figure 5:
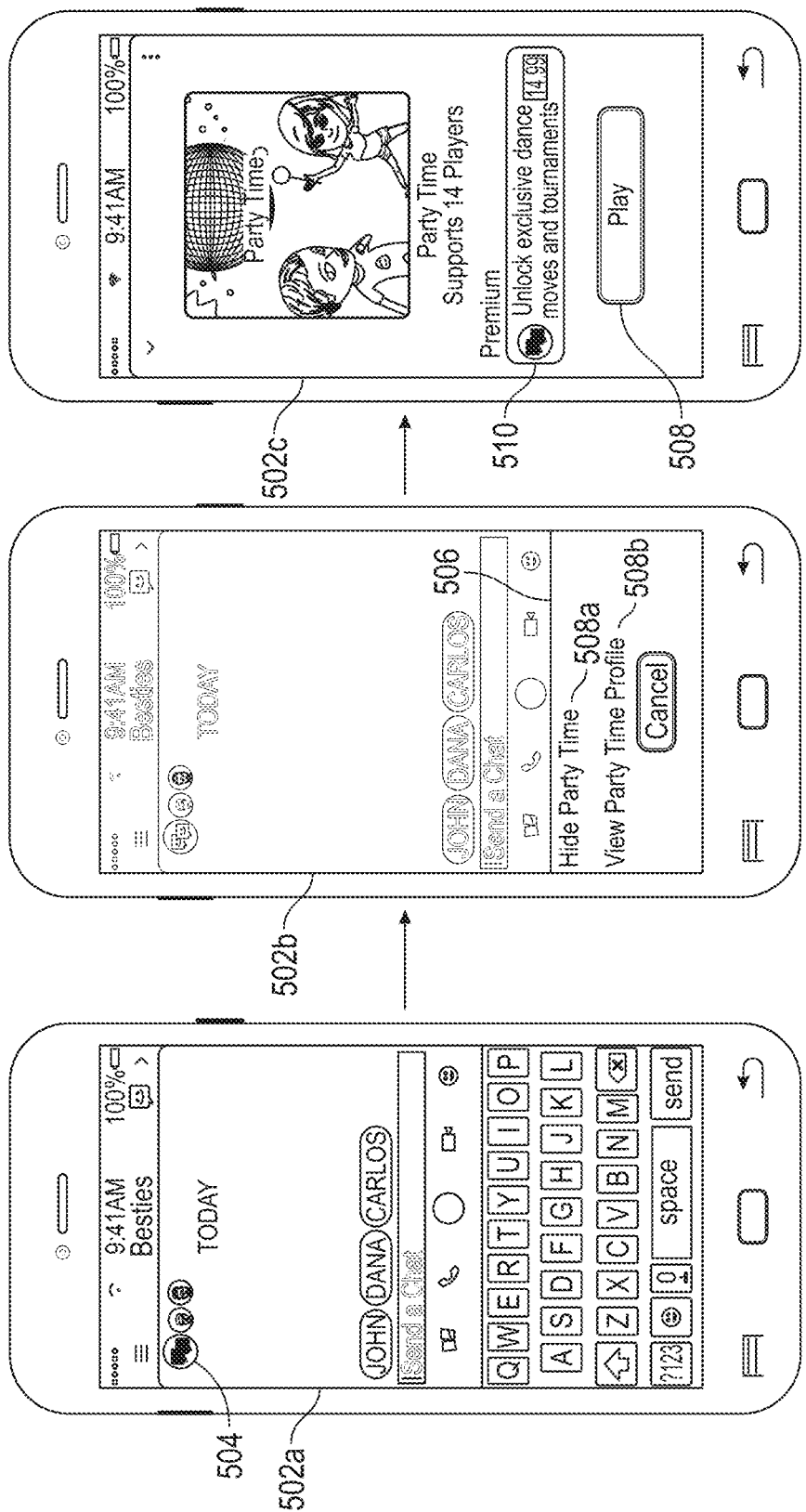
FIG. 5 shows three user interfaces that may be implemented in one or more of the disclosed embodiments.

FIG. 5 shows three graphical user interfaces that may be implemented in one or more of the disclosed embodiments by the messaging client application 104. A first user interface 502a includes an application icon 504 associated with a given web-based application (e.g., a web-based gaming application). The application icon 504 may be presented in a chat window of the messaging client application 104. The chat window allows a user to communicate with users identified in the group chat of user interface 502a. In response to receiving a user selection of the application icon 504, the messaging client application 104 presents the user interface 502b to allow the user to launch a game to play with the users in the group chat.

The user interface 502b includes a window 506. The window 506 displays two selectable options 508a and 508b. In response to receiving a user selection of the option 508a, the messaging client application 104 removes or hides the web-based application associated with the application icon 504. Particularly, the web-based application and its icon is removed from the chat window. In response to receiving a user selection of the option 508b, the messaging client application 104 displays an application profile of the web-based gaining application. An illustrative application profile 502c is also shown in FIG. 5. Application profile 502c includes descriptive information about the selected game or web-based application and also specifies a level of access of the user for the game. Particularly, the messaging client application 104 accesses the gaming information stored in the database for the web-based application that is associated with icon 504.

Referring back to FIG. 4, at operation 404, the messaging client application 104 determines a level of access associated with a user of the messaging application for the web-based application. The messaging client application 104 retrieves the level of access associated with the user for the web-based gaming application from the gaming information stored in the database. The level of access is then presented as part of the application profile 502c.

The application profile 502c includes two options 508 and 510. In response to receiving a user selection of option 508, the messaging client application 104 retrieves the HTML5 file associated with the web-based gaming application and launches the web-based gaming application. Referring back to FIG. 4, at operation 406, the messaging client application 104 transmits to the web-based application, via the platform 124 or directly, the level of access associated with the user. Specifically, as part of launching the web-based gaming application, the messaging client application 104 transmits a message with a user identifier and the determined level of access of the user to the web-based gaming application. In some embodiments, the message is transmitted directly (without involving or passing through the messaging server system 108) to the web-based gaming application. In some embodiments, the message is transmitted via the platform 124 (passing through the messaging server system 108) to the web-based gaming application.

In some embodiments, the web-based gaming application uses the user identifier to search a remote database (e.g., a gaining application server associated with the web-based gaming application) for the level of access of the user. In this way, the web-based gaming application can verify that the level of access specified in the message received from the messaging client application 104 is authorized by comparing the level of access specified in the message received from the messaging client application 104 with the level of access stored for the user in a remote database. The gaming application server may communicate directly or via messaging server system 108 with the messaging client application 104 to verify the level of access associated with the provided user identifier.

At operation 408, the gaming application platform 124 provides access to a first set of features of the web-based application that are associated with the level of access associated with the user. For example, in an embodiment, the option 508 is associated with a standard level of access version of the gaming application. In such cases, the standard level of access version of the gaming application is retrieved and launched by the messaging client application 104 with a message indicating the level of access determined for the user. In another embodiment, the option 508 is associated with a version of the application that is associated with all levels of access. In such cases, the messaging client application 104 accesses the version of the application and launches the application including sending a message specifying the level of access of the user to the web-based application. Based on the version of the application that is retrieved and/or based on the message indicating the level of access of the user, different features of the web-based application are enabled for access.

Any communication, or message discussed above and below as being exchanged between the messaging client application 104 and the web-based application can be transmitted or exchanged directly between the messaging client application 104 and the web-based application (or server associated with the web-based application) and/or indirectly via the messaging server system 108.

In some embodiments, in response to receiving a user selection of option 510, the messaging client application 104 allows a user to upgrade the current level of access for the game (e.g., from standard to premium level of access). The user may upgrade the level of access by purchasing rights to the upgraded level of access and/or by watching one or more advertisement or reward videos. Upon selection of the option 510, a user may submit a payment to the social networking system 122 which facilitates payment to a third-party application server. Upon successful completion of the payment transaction, the social networking system 122 upgrades the level of access associated with the user. In some embodiments, when the level of access associated with the user is a specified level of access (e.g., if the user is associated with a premium level of access), the option 510 may be excluded from being presented in the application profile 502c. In such cases, selection of option 508 causes the corresponding web-based application to launch with the premium level of access features enabled.

Figure 6:
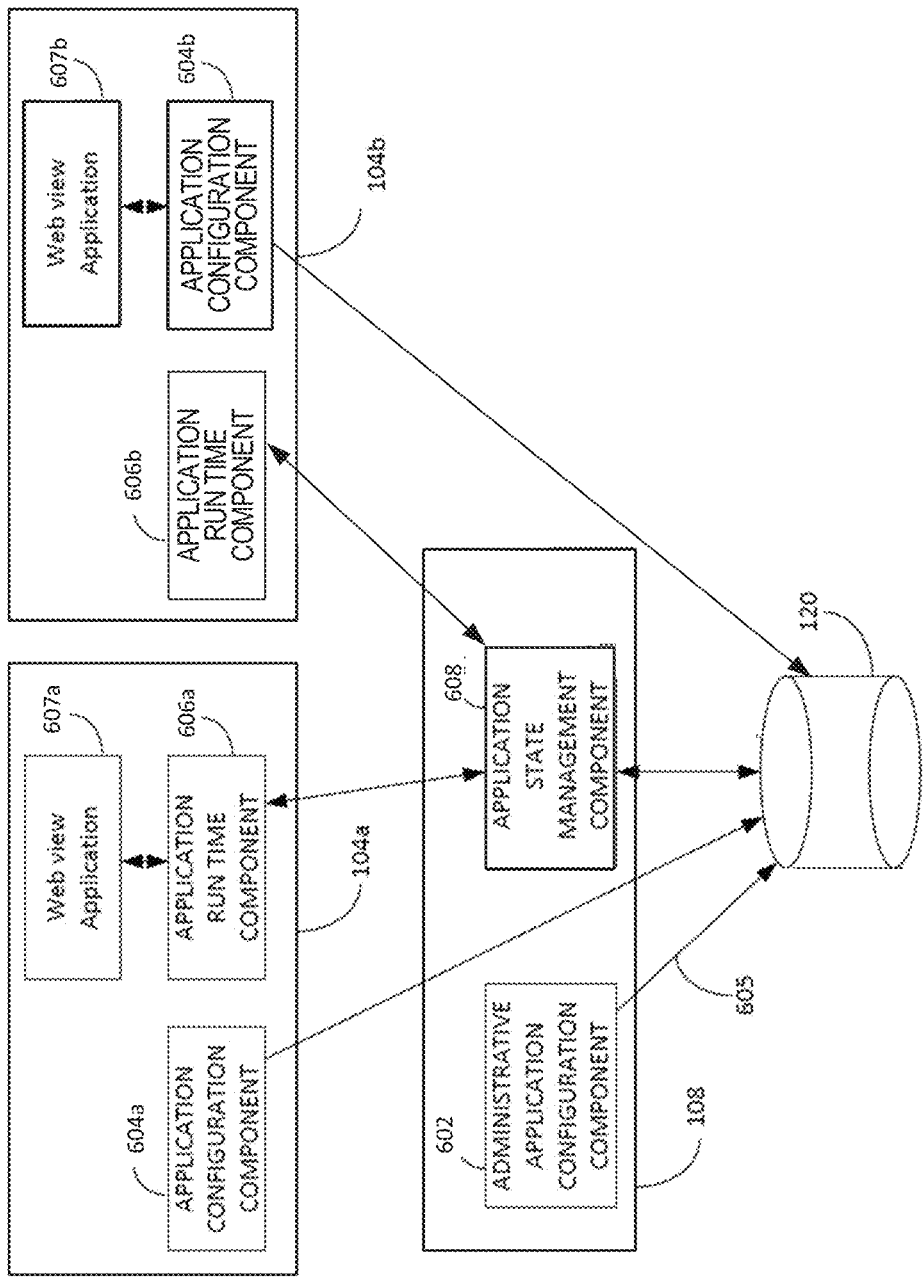
FIG. 6 shows message flows between components that a be implemented in one or more of the disclosed embodiments.

FIG. 6 shows message flows between components that may be implemented in one or more of the disclosed embodiments. FIG. 6 shows two instances of the messaging client application 104 as 104a and 104b. FIG. 6 also shows an instance of the messaging server system 108. Each of the instances of the messaging client application 104a and 104b includes an application configuration component 604a-b and an application run time component 606a-b. Each messaging client application 104a and 104b also includes web view application instances 607a-b respectively.

The messaging server system 108 includes an administrative application configuration component 602 and an application state management component 608.

FIG. 6 shows the administration application configuration component 602 writing configuration data 605 to the database 120. The configuration data 605 may store information regarding one or more applications (e.g. the web view application with instances 607a-b). The configuration data 605 also may indicate configurable features of the application. For example, the configuration data 605 may indicate how many modes or versions the application may execute in. For example, in some aspects, the configuration data 605 may indicate whether a particular application is available in a reduced feature version and a more enhanced feature version. For example, the reduced feature version may provide n features, while the enhanced feature version may include n+C features (with C being a positive constant). Each version may also be specified by the configuration data 605 as being associated with a different level of access. Each version may also specify the criteria needed to upgrade from one level of access to another (e.g., how many reward videos need to be consumed and/or how much money a user needs to pay).

Once an application is configured, by the administrative application configuration component 602, the application may become available for execution on a client device 102, via the messaging client application 104. Thus, the application may appear for execution on a user interface implemented by each of the application configuration component 604a-b. User specific features of the application may then be configured by the application configuration component(s) 604a-b running with the client messaging application 104a-b respectively. Thus, the administrative application configuration component 602 may configure "global" aspects of the application that apply to all users. Then, the behavior of the application may be customized by each user of a client device 102 via their respective application configuration components 604. Each client messaging application 104a-b may then execute the application (e.g. one or more of instances 607a-b) via the application run time component 606a-b respectively. When the application is executing, both application run time components 606a-b interface with an application state management component 608 running within the messaging server system 108. The application state management component maintains a global state of the application.

The global state may encompass a variety of data. For example, in database oriented applications, such as an ecommerce application, the global state may include inventory data stored in the database. In game oriented applications, the global state may indicate, for example, positions within a virtual space of one or more players in the game. As one example, if two users accessing the application run time components 606a-b respectively are both running a game application, both users may experience certain state information for the game that is identical across both users. For example, a position of a first user of the two users within a virtual environment may be displayed to both the first user and a second user of the two users. A second position of the second user may also be displayed to both the first user and the second user via their respective application run time components 606a-b. Other state information may also be shared. For example, in a game application, status or current activity occurring within the game may be included in shared state information. For example, if the first user deploys a weapon within the game, this information may be observable to the second user. The state information managed by the application state management component 608 may also include user-specific state information. For example, in game application embodiments, an amount of life points available to each player/user participating in the game is specific to each user, but may be stored by the application state management component 608. The application state management component 608 may rely on the database 120 to persist any portion of the state information it maintains.

Note that the web view application instances 607a-b run inside a first security domain, while the application run time component(s) 606a-b run inside a second security domain. The first security domain does not have access to data available to the application run time component 606a-b that is running within the second security domain. In some embodiments, the application run time component 606a-b communicates with the database 120 to determine a level of access associated with the user (e.g., a user of messaging client application 104a). The application run time component 606a-b, then sends a secure message, via the gaming application platform 124, to the web view application 607a-b indicating the determined level of access of the user. The web view application 607a-b can then use the user identifier to query another database or the same database 120 to obtain the level of access for the user to compare with the level of access specified in the message received from the application run time component 606a-b.

Note that the web view application instance 607a may be running with different features enabled/disabled or options than the web view application instance 607b. This may be the case even if the two web view application instances 607a-b are the same application (e.g. they have the same application identifier as discussed further below). Thus, for example, the web view application 607a may have a first, more limited set of features enabled, while the web view application 607b has a second, more expansive set of features enabled. Both web view instances 607a-b may operate using their respective instances of the application run time component 606a-b, but may both share the same application state, as managed by the application state management component 608. Thus, two versions of an application may share the same application state in the disclosed embodiments. Specifically, web view application instance 607a may be running with a set of features associated with standard level of access because the application run time component 606a indicated in a message that the user of the messaging client application 104a is associated with standard level of access for this particular application. Web view application instance 607b may be running with a different set of features associated with premium level of access because the application run time component 606b indicated in a message that the user of the messaging client application 104b is associated with premium level of access for this particular application.

Figure 7:
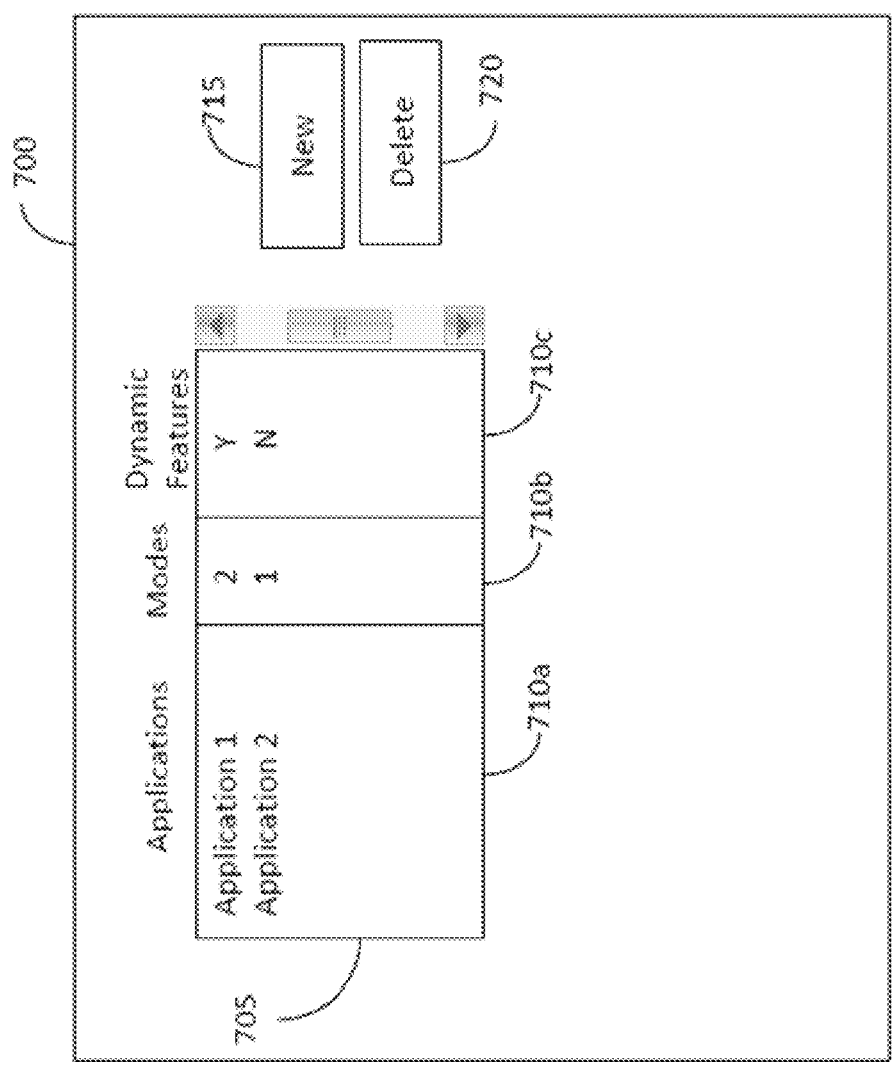
FIG. 7 shows a user interface that may be implemented in one or more of the disclosed embodiments.

FIG. 7 shows a graphical user interface that may be implemented in one or more of the disclosed embodiments. The graphical user interface 700 may be implemented in some aspects by instructions included in the administrative application configuration component 602. In some aspects, the user interface is only accessible to users with administrative security credentials for the social networking system 122

The user interface 700 includes a scrollable list box 705. The scrollable list box 705 includes three columns 710a, 710b, and 710c. The column 710a shows a list of applications configured to run within a computing environment, such as the computing environment provided by the social networking system 122. The column 710b shows a number of modes or versions supported by each of the applications listed in the column 710a. For example, a first application may support a reduced feature set version and a larger feature set version, where the reduced feature set is associated with a first level of access (e.g., a standard level of access) and the larger feature set is associated with a second level of access (e.g., a premium level of access). A second application may support only one version, with the one version providing a consistent set of features to all users.

The column 710c displays whether each of the applications listed in the list box 705 support dynamic features or not. For example, dynamic features may be conditionally enabled after a user begins interacting with the application. As one example, a dynamic feature may include one or more new features provided to a user of an application after the user meets one or more criterion. For example, in some aspects, after the user has been a member of the social network system 122 for a threshold period of time, they may become eligible for an expanded feature set of an application. Namely, the level of access of a user may be upgraded based on the amount of time the user has been a member of the social network system 122 and specifically if the amount of time exceeds the threshold period of time. Alternatively, upon payment of a fee, the user may become eligible for an expanded feature set of an application and upgraded level of access.

The user interface 700 also includes a control 715, such as a button, that provides a method of adding or configuring an additional application. After adding or configuring the additional application, the new application may be listed in the list box 705.

Figure 8:
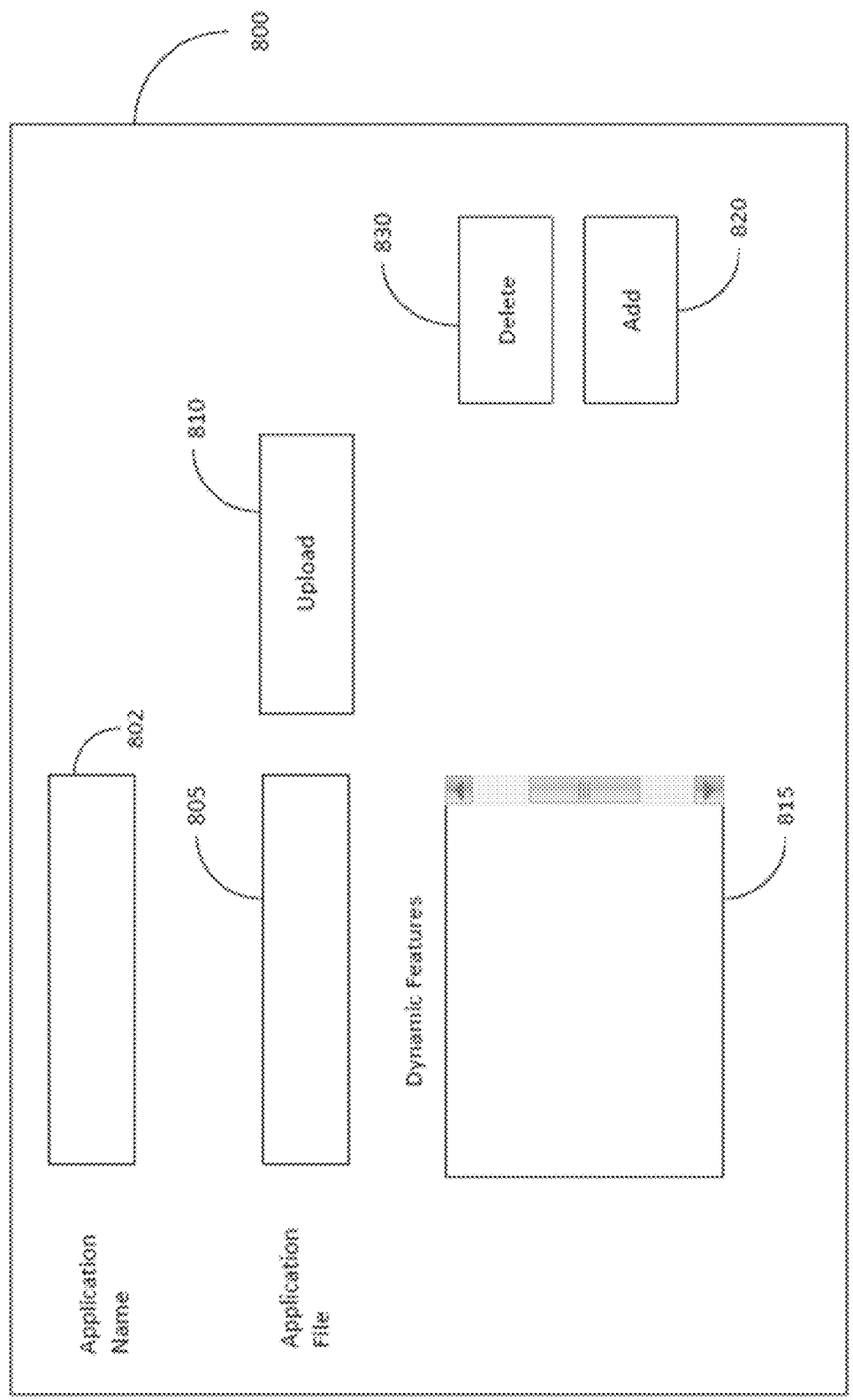
FIG. 8 shows a user interface that may be implemented in one or more of the disclosed embodiments.

FIG. 8 shows a user interface 800 that may be implemented in one or more of the disclosed embodiments. User interface 800 may be displayed, in some aspects, in response to selection of the control 715, discussed above with respect to FIG. 7. The user interface 800 may be displayed by instructions in the administrative application configuration component 202. In some aspects, administrative privileges may be necessary to run and/or display the user interface 800.

The user interface 800 includes an application name field 802, an application file name box 805 and an upload control 810. The application name field 802 facilitates input of an application "friendly" name for an application. The friendly name may be displayed to a user when the user selects and/or runs the application and is displayed as part of the interface 502c.

The application file name box 805 provides a mechanism for an administrative user to identify code implementing an application. In some aspects, the application may execute within a web view, such as the web view instances 607a-b discussed above with respect to FIG. 6. Upon uploading the application, the application becomes runnable by the application run time component 606a-b.

The user interface 800 also includes a scrollable list box 815. The list box 815 lists features that may be dynamically enabled and/or disabled within the application identified in the name field 802. Features may be added via the control 820 and deleted via the control 830.

Figure 9:
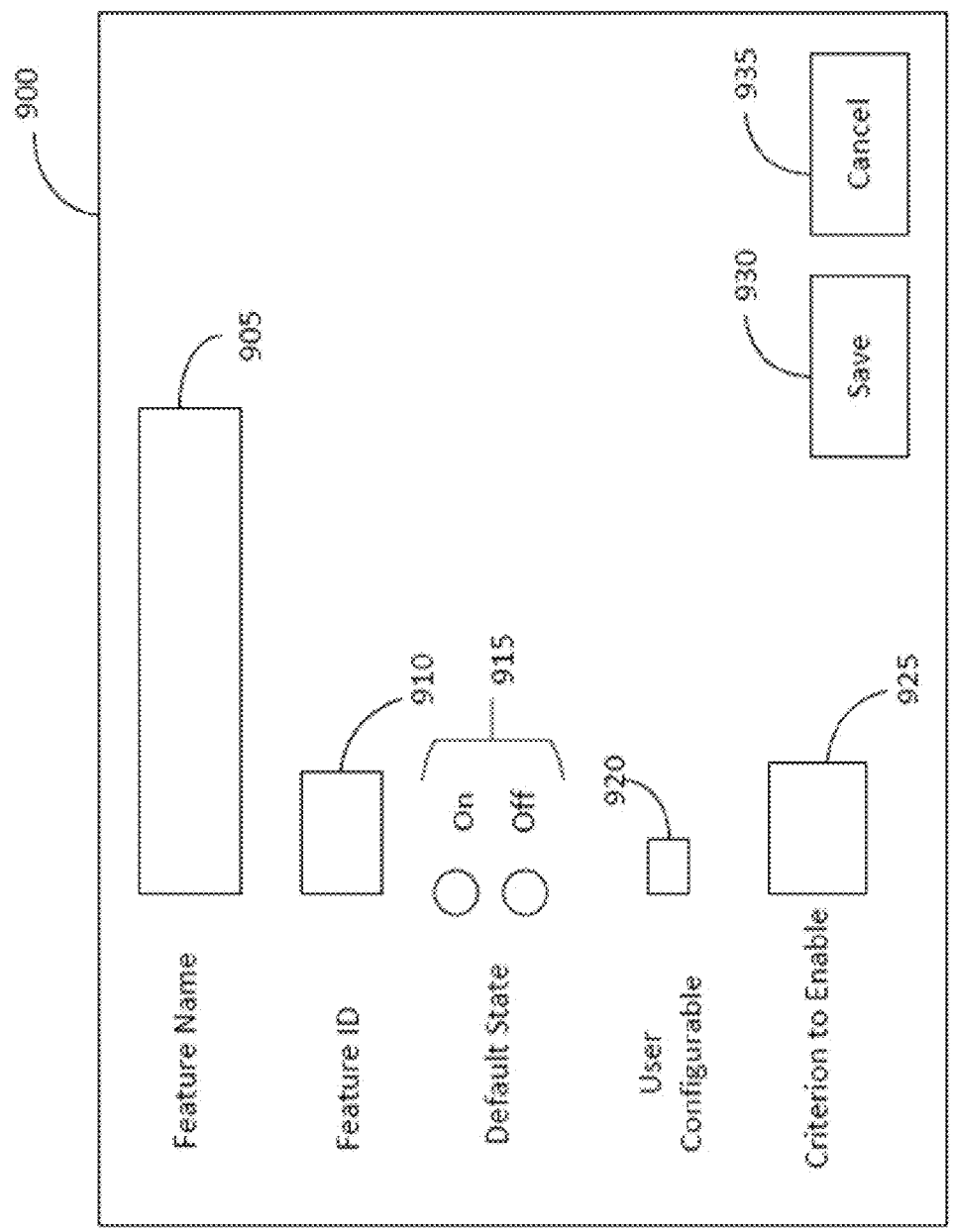
FIG. 9 is a user interface that may be implemented in at least some of the disclosed embodiments

FIG. 9 is a user interface that may be implemented in at least some of the disclosed embodiments. The user interface 900 may be displayed by the administrative application configuration component 202. In some aspects, the user interface 900 may require administrative privileges to be displayed/used by a user.

The user interface 900 includes a feature name field 905, feature id field 910, a default state field 915, a user configurable field 920, a cost to enable field 925, and two controls 930 and 935. The feature name field 905 provides a name for a feature added by the user interface 900. The name entered into the feature name field 905 may be displayed to a user in a menu. For example, a menu may be presented to a user running the application that provides a mechanism to add or delete the feature. The feature id field 910 defines an identifier that may be passed to an application, such as a web view application, to identify a feature. For example, the social network system 122 may configure a feature with a, web view application and identify the feature via the feature id 910. The default state field 915 is implemented as radio controls in the user interface 900. The default state field 915 indicates whether the feature identified in the user interface 900 (via, for example, feature ID 910), is defaulted as either on or off. For example, the default state field 915 defines whether the feature is enabled the first time the application is run for a particular user or if the feature is enabled for users with standard levels of access. The user configurable field 920 defines whether the feature identified by the UI 900, (e.g. via feature id field 910), can be modified by a user. The cost to enable field 925 defines an amount of real or virtual currency that is necessary to enable the feature identified by the user interface 900 (e.g. via the feature id field 910) or to upgrade the level of access for the feature.

Figure 10:
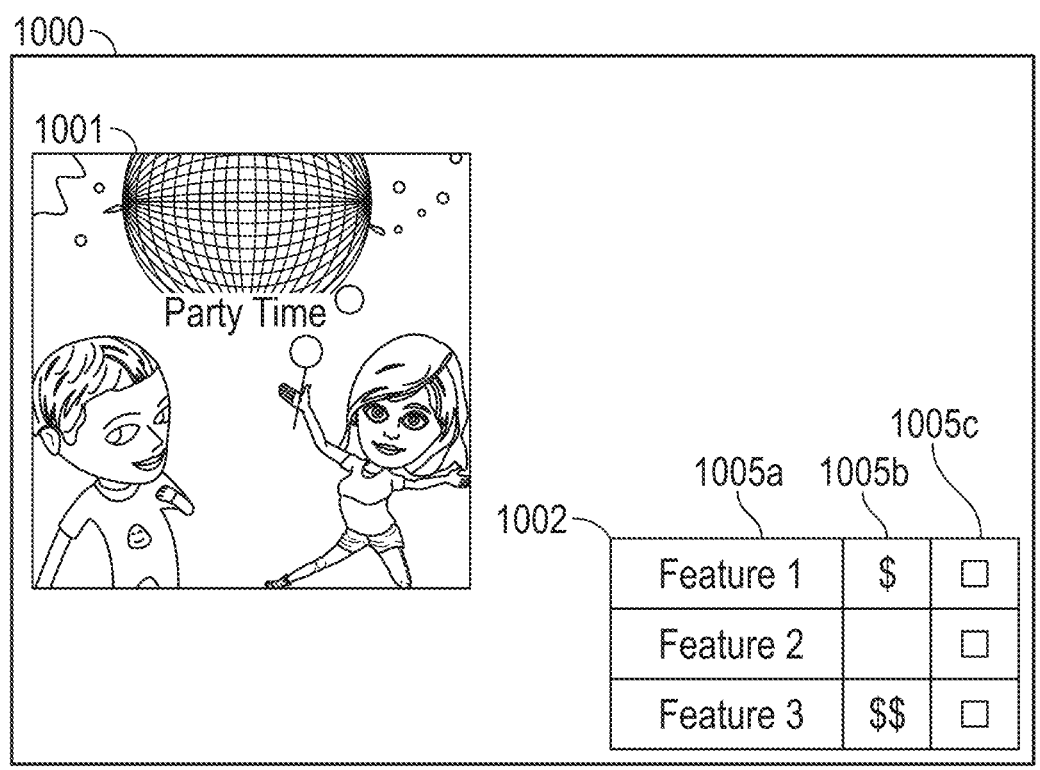
FIG. 10 shows a user interface that nay be implemented in at least some of the disclosed embodiments.

FIG. 10 shows a user interface 1000 that may be implemented in at least some of the disclosed embodiments. The user interface 1000 shows an example application 1001 running after being launched by the messaging client application 104. The user interface 1000 includes a table displayed in the bottom right of the screen. The table 1002 includes three columns 1005a-c. The table 1002 provides for dynamic configuration of features within the application 1001. Data from the table 1002 may be obtained from the list box 815, discussed above with respect to FIG. 8.

For example, each row of the table may represent a feature of the application 1001 that was configured via the user interface 900, discussed above with respect to FIG. 9. Column 1005a indicates a feature name that may be selectively enabled or disabled with the application 1001 based on a level of access of the user. Column 1005b indicates one or more criterion that must be satisfied in order for the feature to be enabled. The criterions listed in column 1005b may represent different levels of access for the application 1001. For example, as discussed above, one criterion may evaluate whether a length of time a user has been a member of the social network system 122 is above a threshold value. Another criterion may evaluate whether the user has submitted a predefined amount of virtual or real currency to pay for the feature using the messaging client application 104. Another criterion may be whether the user has shared a threshold amount of content with other users on the social network. Another criterion may be whether the user has consumed a certain number of reward videos.

Column 1005c may include controls for selective enablement or disablement of the feature identified in the row. If the criterion identified in column 1005b have not been met when a user selects to enable a feature via a control in column 1005c, one or more prompts may be generated. For example, if the user has not paid an amount required to enable the feature, a payment prompt may be generated. Alternatively, if the user is unable to meet a criterion indicated in the column 1005b, for example, a criterion requiring a minimum amount of time as a member of the social network, a notification may be displayed indicating the user is unable to enable the feature.

Figure 11:
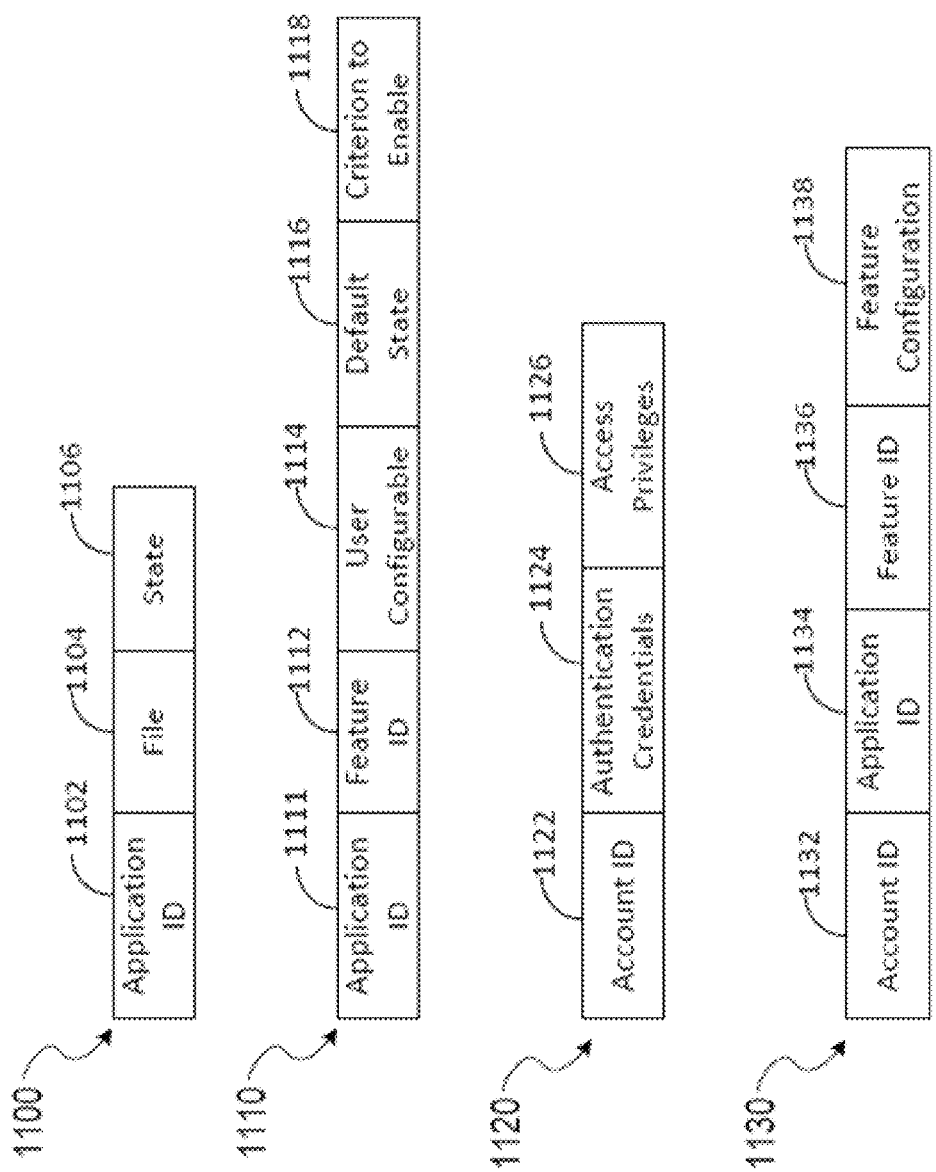
FIG. 11 shows example data structures that may be implemented in one or more of the disclosed embodiments.

FIG. 11 shows example data structures that may be implemented in one or more of the disclosed embodiments. The data structures discussed below with respect to FIG. 11 are described as relational database table structures. However, one of skill would understand that these data structures may be implemented using a variety of techniques known in the art, such as via in memory data structures such as linked lists, arrays, graphs, trees, or other data structures. Alternatively, the data structures could be implemented in an unstructured data store, or using other methods.

An application table 1100 includes an application identifier field 1102, file name field 1104, and an application state field 1106. The application identifier field 1102 uniquely identifies a particular application. The file name field 1104 defines a file that stores code or instructions defining the application. The application state field 1106 stores application state information. The state information may be global state information or user specific state information. The state information 1106 may also include configuration information in some aspects. The state information 1106 may be managed by the application state management component 608.

A feature table 1110 defines features that may be dynamically configured for each application listed in the application table 1100. The feature table 1110 includes an application identifier 1111. The application identifier 1111 may be cross referenced with the application identifier 1102. The feature table 1110 also includes a feature identifier 1112. The feature identifier 1112 may identify a feature of an application. The feature identifier 1112 may store a value that corresponds to the feature identifier provided in field 910 of user interface 900. The user configurable field 1114 indicates whether the feature may be configured by a user. The value stored of the user configurable field 1114 may be provided by the field 920 discussed above with respect to FIG. 9. The default state field 1116 indicates what state the feature is provided in when a user initially runs the application (e.g. 1111). For example, the field 1116 may indicate whether the field is initially enabled or disabled. The field 1118 indicates one or more criterion that must be met before the feature can be enabled. The criterion may include one or more of a payment amount, a threshold period of time the user has been a member of the social network, a threshold amount of content that the user has shared on the social network during a previous defined time period, or other criterion.

An account table 1120 includes an account identifier 1122, an authentication credentials 1124, and an access privileges field 1126. The account identifier 1122 uniquely identifies an account. For example, the account identifier 1122 may uniquely identify an account of the social networking system 122. The authentication credentials field 1124 stores authentication credentials, such as an account name and/or account password, for the account identified by the account identifier 1122. The access privileges field 1126 stores data indicates which access privileges are associated with the account. For example, the access privileges field 1126 may indicate whether the account has administrative access to resources of the social network system 122.

An account specific feature configuration table 1130 includes an account identifier 1132, application identifier 1134, feature identifier 1136, and feature configuration field 1138. The account identifier field 1132 can be cross referenced with the account identifier field 1122. The application identifier field 1134 may be cross referenced with the application identifier field 1111 and/or 1102. The feature identifier field 1136 can be cross referenced with the feature id field 1112. The feature configuration 1138 indicates how the feature is configured for the particular account identified by the account identifier 1132. For example, the feature configuration 1138 may indicate a binary value, such as whether the feature is on or off (enabled/disabled), or a natural value such as an integer value indicating a number of life points available to the account. The account identifier 1132 may specify the user identifier of the user of the messaging client application 104 and the level of access determined by the messaging client application 104 for the particular application for the particular user. The account identifier 1132 is transmitted by the messaging client application 104 to the web-based application to indicate to the web-based application the level of access of the user. The web-based application may then selectively enable features based on the level of access as specified by the criteria in FIG. 10.

Software Architecture

Figure 12:
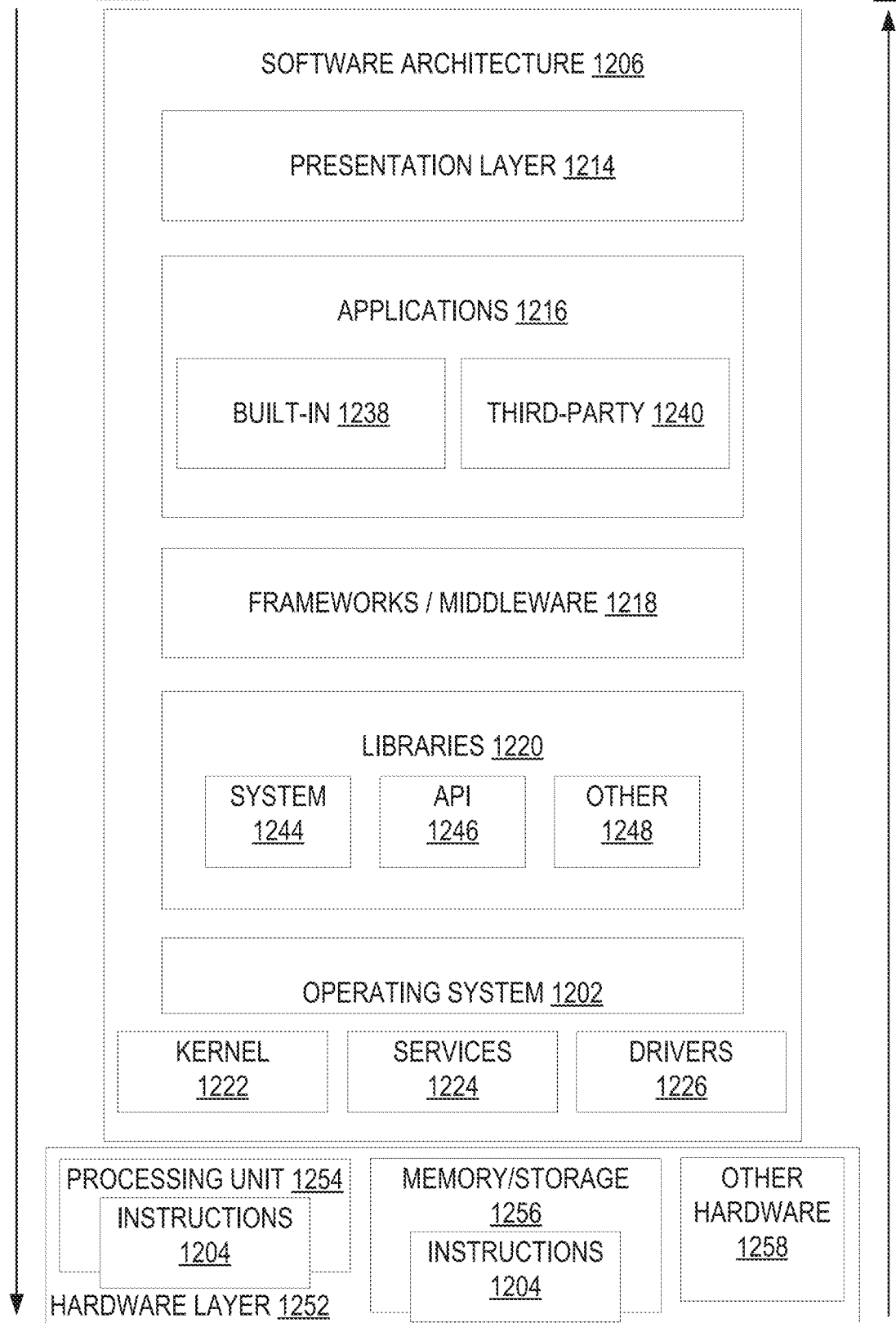
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as a machine 1300 of FIG. 13 that includes, among other things, processors 1304, memory/storage 1306, and I/O components 1318. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes memory and/or storage 1256, which also have the executable instructions 1204. The hardware layer 1252 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions, Components may be combined via their interfaces with other components to carry out a machine process. A component may be a packaged functional hardware unit designed for use with other components and a part of a program at usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response as messages 1210. The layers illustrated are representative in nature and not all software architectures have all layers. For example, some mobile or special-purpose operating systems may not provide a frameworks/middleware 1218 layer, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as the presentation layer 1214. In these systems, the application/component "logic" can be separated from the aspects of the application/component that interact with a user.

Exemplary Machine

Figure 13:
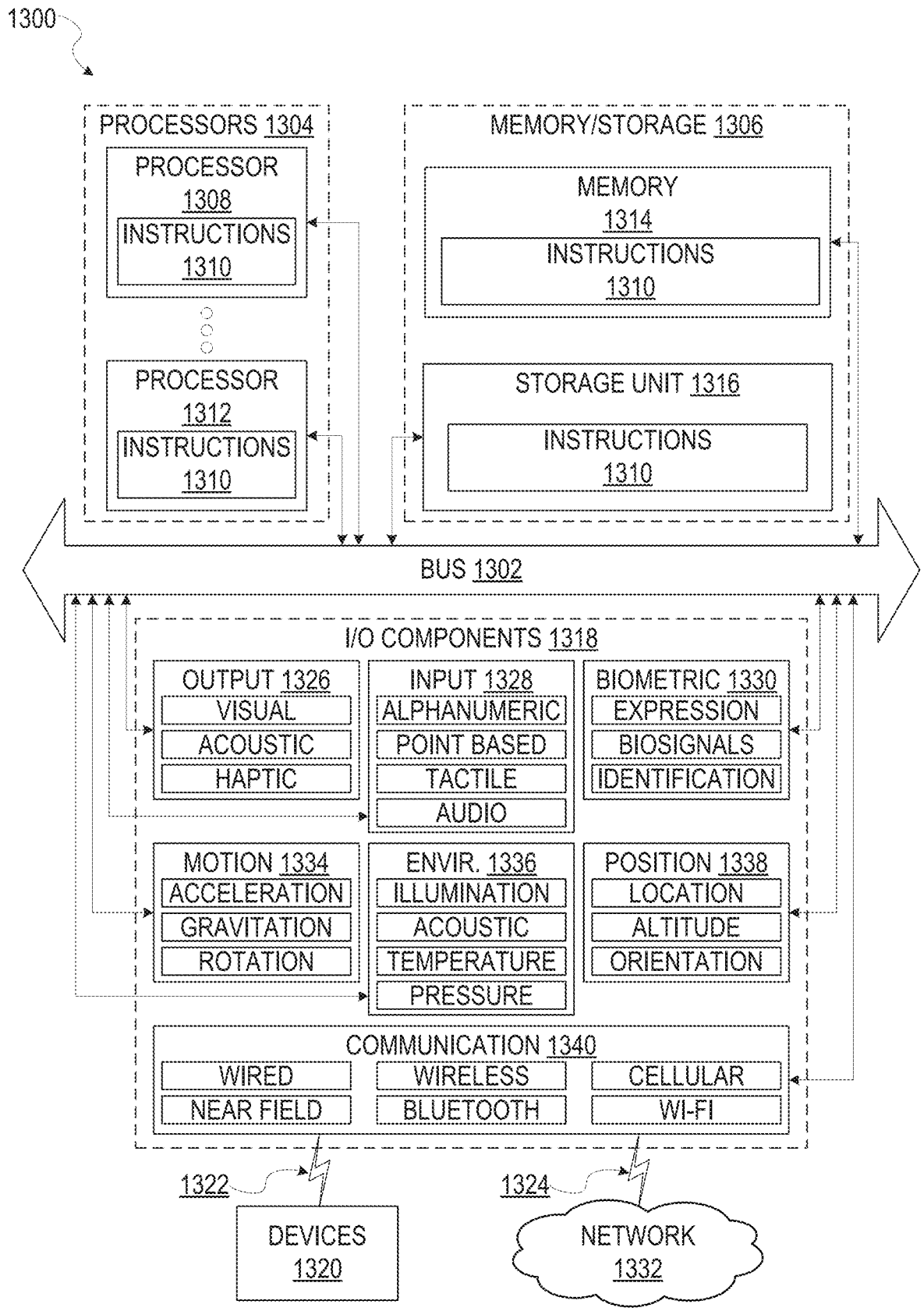
FIG. 13 is a block diagram illustrating components of a machine, according to some exemplary embodiments, able to read instructions from a machine-readable medium (e.g., a machine-readable storage medium) and perform any one or more of the methodologies discussed herein.

FIG. 13 is a block diagram illustrating components (also referred to herein as "modules") of a machine 1300, according to some exemplary embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1318 may include a wide variety of components to provide a user interface for receiving input, providing output, producing output, transmitting information, exchanging information, capturing measurements, and so on. The specific I/O components 1318 that are included in the user interface of a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various exemplary embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1328 may also include one or more image-capturing devices, such as a digital camera for generating digital images and/or video.

In further exemplary embodiments, the I/O components 1318 may include biometric components 1330, motion components 1334, environment components 1336, or position components 1338, as well as a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322 respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
providing, by one or more processors, a platform that facilitates communication between a messaging application and a web-based application, the platform storing a plurality of markup language documents associated with the web-based application, a first of the plurality of markup language documents corresponding to a first version of a given set of levels of the web-based application and a first level of access to the given set of levels and a second of the plurality of markup language documents corresponding to a second version of the given set of levels of the web-based application and a second level of access to the given set of levels;
storing an application programming interface (API), associated with the messaging application, on a server;
establishing, via a JavaScript bridge, two one-way asynchronous communication channels between the messaging application and the web-based application, wherein functions of the API, invoked by the web-based application or the messaging application, are transmitted as messages over the asynchronous communication channels, such that each API function invocation is sent as a message, and callback for each API function is sent by constructing a unique callback identifier and sending a message with the callback identifier;
providing, via the JavaScript bridge of the platform, an authentication token to the web-based application in response to receiving a request for the authentication token from the web-based application via the platform, wherein the authentication token expires after a prespecified period of time;
receiving, by the one or more processors, from a graphical user interface of the messaging application, a request to launch the web-based application;
determining, by the messaging application, a level of access associated with a user of the messaging application for the web-based application;
transmitting, by the messaging application to the web-based application via the JavaScript bridge, the level of access associated with the user;
causing the web-based application to verify the level of access associated with the user by:
providing, to the web-based application via the JavaScript bridge, a message from the messaging application comprising a user identifier and the level of access associated with the user;
searching an application server associated with the web-based application for a remotely stored level of access associated with the user identifier; and
comparing the level of access specified in a message received from the messaging application with the remotely stored level of access to verify the level of access of the user;
obtaining one of the first and second markup language documents based on the level of access associated with the user; and
launching the obtained one of the first and second markup language documents to provide, by the one or more processors, access to a first set of features of the web-based application that are associated with the level of access associated with the user.

2. The method of claim 1, wherein the level of access is transmitted via the platform that is implemented by a messaging server, and wherein the web-based application comprises a web-based gaming application, wherein the first markup language document is obtained in response to determining that the level of access associated with the user corresponds to the first level of access, and wherein the second markup language document is obtained in response to determining that the level of access associated with the user corresponds to the second level of access, and wherein the first and second markup language documents include different sets of features of the web-based application.

3. The method of claim 1, wherein the level of access comprises a premium level of access, wherein the first set of features of the web-based application is activated for the premium level of access and is de-activated for a standard level of access.

4. The method of claim 1 further comprising:
determining that the level of access is a standard level of access; and
in response to determining that the level of access is the standard level of access, generating for display in the graphical user interface of the messaging application a first option to upgrade the level of access to a premium level of access for the web-based application.

5. The method of claim 4, wherein the graphical user interface includes the first option and a second option to launch the web-based application based on the standard level of access.

6. The method of claim 4 further comprising:
receiving a user selection of the first option;
using the messaging application to complete a purchase transaction for the premium level of access to the web-based application with a third-party source; and
storing an indication in a user account of the messaging application that the purchase transaction for the premium level of access has been completed.

7. The method of claim 1 further comprising:
identifying, by the messaging application, a version of the web-based application associated with the level of access;
launching, by the messaging application, the first version of the web-based application in response to determining that the level of access is a first level of access; and
launching, by the messaging application, the second version of the web-based application in response to determining that the level of access is a second level of access.

8. The method of claim 7, wherein the first version of the web-based application and the second version of the web-based application access common application state data maintained by the messaging application.

9. The method of claim 1, wherein the web-based application provides the first version of the web-based application in response to determining that the level of access is a first level of access, and wherein the web-based application provides the second version of the web-based application in response to determining that the level of access is a second level of access.

10. The method of claim 1, wherein the first set of features comprises a collection of levels of the web-based application that are available for a first level of access and that are not available for a second level of access.

11. The method of claim 1, wherein the first set of features comprises a collection of levels of the web-based application that are available for a first level of access without advertisements and that are available for a second level of access with advertisements.

12. The method of claim 1, wherein the first set of features comprises a first rate for earning rewards in the web-based application for a first level of access and that is different from a second rate for earning rewards in the web-based application for a second level of access.

13. The method of claim 1 further comprising:
determining that the level of access is a premium level of access; and
in response to determining that the level of access is the premium level of access, generating for display in the graphical user interface of the messaging application an option to launch the web-based application, wherein the graphical user interface excludes an option to upgrade the level of access when the determined level of access is the premium level of access.

14. The method of claim 1 further comprising:
accessing, by the web-based application, a remote database in which is stored an association between the user and the level of access; and
retrieving from the database the level of access associated with the user to verify that the retrieved level of access matches the level of access received from the messaging application.

15. The method of claim 1 further comprising:
processing data by the web-based application using the authentication token.

16. The method of claim 1 further comprising preventing the web-based application from being authorized when the web-based application is launched from an application that is different from the messaging application.

17. The method of claim 1 further comprising launching, via the platform, the web-based application from the messaging application.

18. A system comprising:
a processor configured to perform operations comprising:
providing a platform that facilitates communication between a messaging application and a web-based application, the platform storing a plurality of markup language documents associated with the web-based application, a first of the plurality of markup language documents corresponding to a first version of a given set of levels of the web-based application and a first level of access to the given set of levels and a second of the plurality of markup language documents corresponding to a second version of the given set of levels of the web-based application and a second level of access to the given set of levels;
storing an application programming interface (API), associated with the messaging application, on a server;
establishing, via a JavaScript bridge, two one-way asynchronous communication channels between the messaging application and the web-based application, wherein functions of the API, invoked by the web-based application or the messaging application, are transmitted as messages over the asynchronous communication channels, such that each API function invocation is sent as a message, and callback for each API function is sent by constructing a unique callback identifier and sending a message with the callback identifier;
providing, via the JavaScript bridge of the platform, an authentication token to the web-based application in response to receiving a request for the authentication token from the web-based application via the platform, wherein the authentication token expires after a prespecified period of time;
receiving, from a graphical user interface of the messaging application, a request to launch the web-based application;
determining, by the messaging application, a level of access associated with a user of the messaging application for the web-based application;
transmitting, by the messaging application to the web-based application via the JavaScript bridge, the level of access associated with the user;
causing the web-based application to verify the level of access associated with the user by:
providing, to the web-based application via the JavaScript bridge, a message from the messaging application comprising a user identifier and the level of access associated with the user;
searching an application server associated with the web-based application for a remotely stored level of access associated with the user identifier; and
comparing the level of access specified in a message received from the messaging application with the remotely stored level of access to verify the level of access of the user;
obtaining one of the first and second markup language documents based on the level of access associated with the user; and
launching the obtained one of the first and second markup language documents to provide access to a first set of features of the web-based application that are associated with the level of access associated with the user.

19. The system of claim 18, wherein the level of access is transmitted via the platform that is implemented by a messaging server, and wherein the web-based application comprises a web-based gaming application, wherein the first markup language document is obtained in response to determining that the level of access associated with the user corresponds to the first level of access, and wherein the second markup language document is obtained in response to determining that the level of access associated with the user corresponds to the second level of access, and wherein the first and second markup language documents include different sets of features of the web-based application.

20. A non-transitory machine-readable storage medium that includes instructions that, when executed by one or more processors of a machine, cause the machine to perform operations comprising:
providing a platform that facilitates communication between a messaging application and a web-based application, the platform storing a plurality of markup language documents associated with the web-based application, a first of the plurality of markup language documents corresponding to a first version of a given set of levels of the web-based application and a first level of access to the given set of levels and a second of the plurality of markup language documents corresponding to a second version of the given set of levels of the web-based application and a second level of access to the given set of levels;

storing an application programming interface (API), associated with the messaging application, on a server;
establishing, via a JavaScript bridge, two one-way asynchronous communication channels between the messaging application and the web-based application, wherein functions of the API, invoked by the web-based application or the messaging application, are transmitted as messages over the asynchronous communication channels, such that each API function invocation is sent as a message, and callback for each API function is sent by constructing a unique callback identifier and sending a message with the callback identifier;
providing, via the JavaScript bridge of the platform, an authentication token to the web-based application in response to receiving a request for the authentication token from the web-based application via the platform, wherein the authentication token expires after a pre-specified period of time;
receiving, from a graphical user interface of the messaging application, a request to launch the web-based application;
determining, by the messaging application, a level of access associated with a user of the messaging application for the web-based application;
transmitting, by the messaging application to the web-based application via the JavaScript bridge, the level of access associated with the user;
causing the web-based application to verify the level of access associated with the user by:
 providing, to the web-based application via the JavaScript bridge, a message from the messaging application comprising a user identifier and the level of access associated with the user;
 searching an application server associated with the web-based application for a remotely stored level of access associated with the user identifier; and
 comparing the level of access specified in a message received from the messaging application with the remotely stored level of access to verify the level of access of the user;
obtaining one of the first and second markup language documents based on the level of access associated with the user; and
launching the obtained one of the first and second markup language documents to provide access to a first set of features of the web-based application that are associated with the level of access associated with the user.

* * * * *